Aug. 11, 1942. C. R. ROCHE 2,292,482

TRANSMISSION

Original Filed Aug. 19, 1940

INVENTOR.

Clifton R. Roche

Patented Aug. 11, 1942

2,292,482

UNITED STATES PATENT OFFICE 2,292,482

TRANSMISSION

Clifton R. Roche, Los Angeles, Calif.

Original application August 19, 1940, Serial No. 353,253. Divided and this application November 26, 1940, Serial No. 367,159

23 Claims. (Cl. 74—189.5)

My invention relates to automatic variable speed transmissions, and relates particularly to transmissions of the planetary gear type.

The present application is a division of my prior application Serial Number 353,253, filed on August 19, 1940.

One of the objects of my invention is to provide a transmission with an infinite number of ratios, instead of the customary three as in the conventional automobile transmission.

A further object of my invention is to provide a device for operating a fluid flywheel at comparatively high speeds, thereby increasing the inertia of the rotating fluid, thus decreasing the required size of the fluid flywheel.

A further object of my invention is to provide a transmission with an infinite number of ratios, and means for automatically selecting, and shifting to, the required ratio.

Further objects and advantages of the invention will be made evident throughout the following part of the specification.

Referring to the drawing which is for illustrative purpose only,

Figure 1:
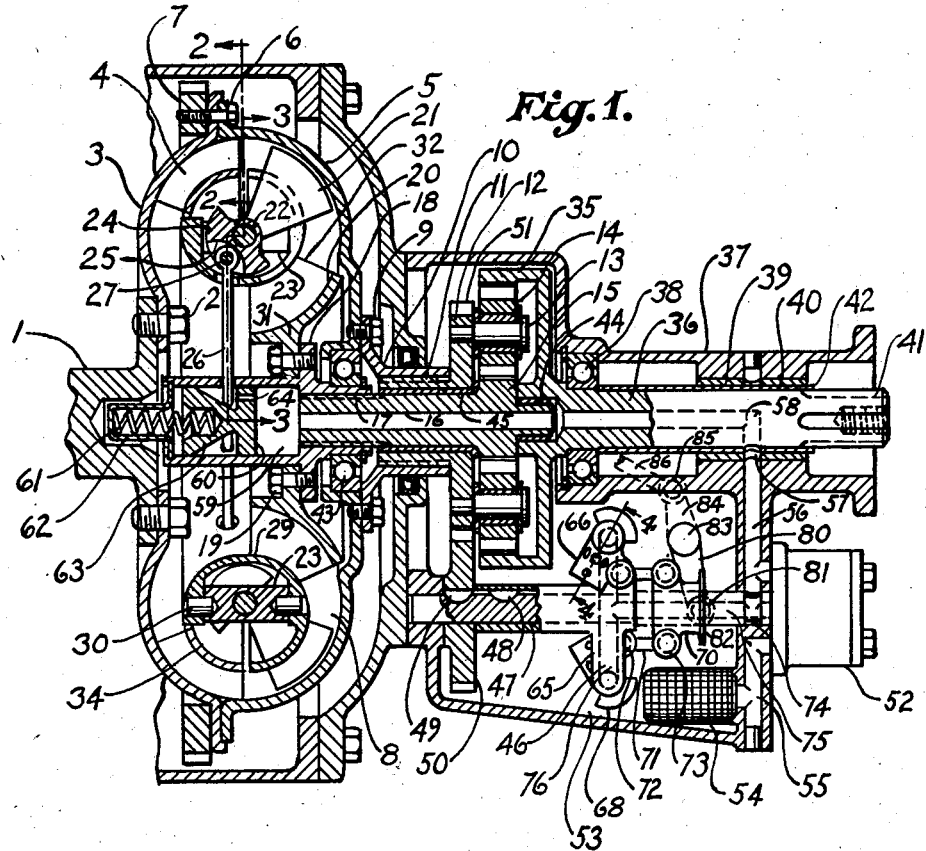
Fig. 1 is a vertically longitudinally sectioned view through a preferred embodiment of my invention.
Figure 2:
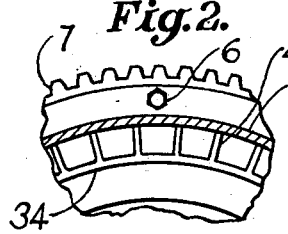
Fig. 2 is a fragmentary cross section on a plane represented by the line 2—2 of Fig. 1.
Figure 3:
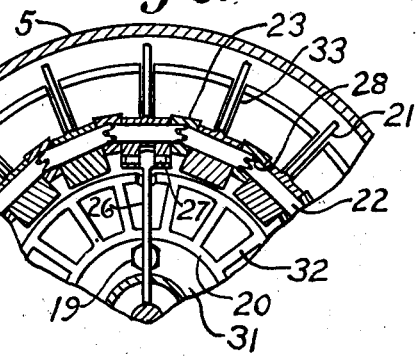
Fig. 3 is a fragmentary cross section on a plane represented by the line 3—3 of Fig. 1.
Figure 4:
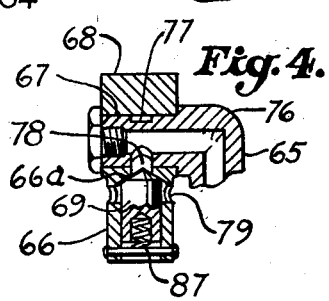
Fig. 4 is a sectioned view of one of the control valves taken on a plane represented by the line 4—4 of Fig. 1.

Referring to the drawing, my invention includes a drive member 1, which if used on an automobile having an engine, may be the crank shaft of the engine. Bolted to the drive member by means of bolts 2 is a driven element 3 which includes a set of blades or impellers 4. A housing 5 is bolted to the driven element 3 by the bolts 6, which may also hold a starting gear 7 of an engine, forming a compartment 8 which may retain oil or other operating fluid. Bolted to the housing 5 by bolts 9 is a bracket 10 whose splines 11 rotate a gear carrier 12. Thus by rotating the drive member 1, the gear carrier 12 will be rotated.

Studs 13 are securely fastened in the gear carrier 12, upon which are rotatively mounted planet gears 14, which mesh with a sun gear 15 which has an extending shaft 16. Mounted upon shaft 16 and held in rotation by splines 17 is a driving flange 18 to which is securely fastened by bolts 19, a driving element 20.

The driving element 20 includes a movable set of blades or impellers 21, in which are securely fastened pins 22. These pins are mounted in a bracket 23 forming a pivot center around which the blades 21 can swing. The blades 21 are counterbalanced by means of weights 24, and one of every several weights has a slot 25 to receive an adjustment rod 26, which is pivoted to the blades 21 by a pin 27.

On the ends of the pins 22 are teeth 28, and one pin's teeth are in mesh with the next pin's teeth, and thus all the blades will swing inwardly or outwardly together according to adjustment of the adjustment rods 26.

The brackets 23 are fastened to a ring shaped part 29, of the driving element, by pins 30 and this ring shaped part is supported on a hub portion 31, of the driving element, by ribs, or fixed blades 32. The ring shaped part 29 has slots 33 to allow the blades 21 to swing completely out, or into-between the ribs 32.

In order to maintain a smooth flow of fluid around the ring shaped part, a continuation of the ring is formed by a ring 34 which is fastened to the set of blades 4 of the driven element.

Thus a fluid flywheel is formed with a set of driving blades and a set of driven blades, and the effective diameter of one set of blades adjustable in relation to the effective diameter of the other set of blades.

To explain the action of my invention, assume the blades 21 to be swung into-between the ribs 32. This gives a minimum effective diameter as the compartment 8 is now free of blades between the ribs 32 and the blades 4. Now suppose the shaft 16 is driven at a high rate of speed. This will cause a particle of the fluid within the blades 21, and the ribs 32 to rotate at this high rate of speed giving it kinetic energy. The centrifugal force also causes the particle of fluid to move out away from the blades around the ring shaped part 29, into that portion of the compartment 8 which is free of blades. Since the kinetic energy of the revolving particle of fluid remains the same and its diameter of rotation increases, as it moves away from the ribs 32 toward the blades 4, it follows that its speed of rotation must be reduced, and when it comes in contact with the blades 4, its kinetic energy is picked up by the driven blades 4, which have a relatively large effective diameter, so the speed of rotation of the driven element 3 will be reduced compared to the speed of the shaft 16.

If the blades 21 are moved outwardly to their maximum effective diameter, the effective diameter of the driving element will equal the effective diameter of the driven element and the ratio will be substantially one to one, and any ratio between can be obtained by adjusting the effective diameter of the movable set of blades. Such a device therefore, incorporates therein a fluid flywheel having means for variable speed ratios of stepless regulation.

This principle can be demonstrated by a skater who is spinning around like a top. If his arms are extended he will spin at a slow speed, but if his arms are drawn in, he will spin at a high speed, and he can control his speed by the effective diameter of his arms.

In automobile transmissions, it is usually necessary to obtain at least a 3 to 1 ratio, but to obtain a 3 to 1 ratio with the simple form of the invention just described it would be necessary to use an effective diameter of the driven blades so large that it would be inconvenient to locate the transmission in the automobile. Therefore I provide a novel planetary gear arrangement to increase the speed of the driving element as the required ratio is increased, and which also acts as a means of obtaining ratios from infinity to one to one, thereby decreasing the required size of the fluid flywheel.

The planet gears 14 mesh with the teeth of a driven gear 35, which may be an internal gear and which has an extending shaft 36 which is the driven shaft of the transmission. This shaft is rotatively mounted in a housing 37 by bearings 38, 39 and 40. The driven shaft 36 may include splines 41 to drive a reverse gear and clutch, or other desired mechanism, not shown, but which may abut against a spacer sleeve 42 which locks the inner race of bearing 38 on the driven shaft 36.

Bearings 43 and 44 are provided to hold the sun gear 15 and shaft 16 in axial alignment, and a bearing 45 is provided as a guide for the gear carrier 12.

The relative sizes of the sun gear in respect to the planet gears may be selected so as to obtain about a two and one-half to one ratio between the planet gear carrier 12, and the sun gear; that is for each revolution of the planet gear carrier 12, the sun gear 15 will make two and one-half revolutions if the driven gear 35 is held stationary. Therefore, if the effective diameter of the blades of the driving element in respect to the effective diameter of the blades of the driven element will give a ratio of two and one-half to one, there will be no rotation to the driven shaft 36 regardless of the speed of the drive member 1, so that the ratio between the drive member 1 and the driven shaft 36 is infinity, and the ratio of the transmission is infinity.

If the blades of the driving element are adjusted to obtain a one to one ratio for the fluid flywheel, the planet gear carrier 12 and the sun gear 15 will rotate at substantially the same speed which necessitates the driven gear 35 and the driven shaft 36 to rotate at this same speed and therefore the ratio of the transmission is one to one. Therefore, by adjusting the effective diameter of the blades, any desired ratio for the transmission can be obtained from infinity to one to one.

Also the sun gear that drives the driving element must always rotate at least as fast as the drive member, and as larger ratios are approached the driving element may rotate as much as two and one-half times the drive member speed. Thus both elements of the fluid flywheel are always rotating at relatively high speeds, thereby allowing the use of a fluid flywheel of comparatively small size.

In order to automatically control the ratio of the transmission, I provide a governor 46 which is mounted for rotation on a shaft 47 by a key 48. This shaft is driven through a key 49 by a gear 50 whose teeth mesh with gear teeth 51 which are a part of the gear carrier 12. The shaft 47 also serves to drive a fluid pump 52 which draws in fluid from a sump 53 through a strainer 54 and through a passage 55. The pump forces the fluid under pressure to passage 56 which leads to a space 57 between the bearings 39 and 40. A passage 58 always registers with the space 57 and the fluid under pressure from the pump can continue through the hollow shaft 16 to a cylindrical compartment 59. The pressure of the fluid acts on a piston head 60 which is balanced by the pressure of a spring 61 that is held in a container 62.

A cone shaped extension 63 extends from the piston against which the control rods 26 abut, due to the balance of the centrifugal force of the blades 21 being slightly greater than that of the counterweights 24.

If the pressure of the fluid in the compartment 59 is increased, the piston will be forced to the left, and the control rods 26 will allow the centrifugal force to rotate the blades 21 to a greater effective diameter, and if the pressure in compartment 59 is decreased, the spring 61 will force the cone to the right so as to move the control rods and rotate the blades 21 to a smaller effective diameter.

A small hole 64 allows some of the fluid to escape which keeps the compartment 8 filled with fluid and the excess fluid is allowed to escape from compartment 8 through a passage (not shown) under the splines 11 and flows back into the sump 53.

The governor is constructed with arms 65, having extensions 67 upon which may swing valve bodies 66. To prevent the centrifugal force from acting to swing the valve bodies, counter weights 68 are provided. In each of the valve bodies is a valve 69 which is forced against a valve seat 66a, partially by means of a spring 87, and partially due to the centrifugal force caused by the weight of the valve 69 being rotated about the axis of the shaft 47. A shifting bracket 70 is linked to the valve bodies by links 71 and pins 72 and 73, so that moving the shifting bracket to the right will swing the valve to a vertical position whereas moving the shifting bracket to the left will swing the valve to a horizontal position. When in the vertical position the full effect of the centrifugal force acts to thrust the valve against the valve seat, whereas when in the horizontal position, none of the centrifugal force acts to thrust the valve against the valve seat.

The governor acts to regulate the fluid pressure on the piston 60, as the passage 56 registers with an annular groove 74 which communicates with a passage 75 and 76 and through to an annular groove 77 which communicates with a compartment 78 which is above the head of the valve 69, thus allowing the fluid pressure to act against the head of the valve, and thus this valve acts as a pressure regulator valve, for when the fluid pressure becomes great enough to overcome the force of the spring 87 and the centrifugal force of the valve, the valve will be forced from its seat 66a allowing the fluid to escape through the holes 79.

The shifting bracket 70 is moved to the right or left by a lever 80, in the end of which is a pin 81 with a slotted head that receives a ring 82 that is part of the bracket 70. The lever 80 is fastened to a shaft 83 which extends through to the outside of the housing 37. Outside the housing and fastened to the shaft 83 is a lever 84. Thus if the lever 84 is rocked, the position of the shifting bracket may be changed to the right or left.

When the transmission is used in an automobile having a gasoline, or fuel operated engine, I prefer to connect the lever 84 with the engine throttle, or accelerator, so that by depressing the accelerator the lever 84 will be moved to shift the shifting bracket to the left. A control rod 86, leading from the accelerator pedal, is connected to the lever 84 by a pin 85, to accomplish this action.

The tendency of the governor is to hold the engine speed at about a constant speed while the automobile picks up speed from a standstill to direct drive, for if there is a tendency for the motor speed to increase, the governor speed will also increase which, due to the increase in centrifugal force, increases the pressure of the valve 69 against its seat, thus resulting in an increase in the fluid pressure against the piston head 60 which forces it to the left thereby allowing the effective diameter of the driving element to increase which as previously explained will decrease the ratio of the transmission which tends to decrease the speed of the engine, to the first named constant speed.

However, if the accelerator is depressed, the valve 69 will be shifted to a more horizontal position which decreases the effect of the centrifugal force tending to hold the valve 69 against its seat. Thus the engine speed will be held at about a constant speed as the automobile picks up speed from a standstill to direct drive, but at a higher constant speed than was first mentioned.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims. For instance, in case a ratio of two to one were desired, in place of the previously mentioned two and one-half to one ratio, the planet gears could be bevel gears, and the sun gear and driven gear could be bevel gears of equal size which would give the desired two to one ratio, and if less than a two to one ratio were desired, the driven gear could be made smaller than the sun gear, in which case the sun gear could be of the internal gear type with the planets running internally.

I claim as my invention:

1. A transmission of the character described including: planetary gear means; a drive member to drive the planetary gear means; a driven shaft driven by the planetary gear means; a fluid flywheel including a driving element, a driven element, and one of said elements having a set of blades adjustable to move radially away from, or closer to, the axis of rotation of the fluid flywheel for adjusting the speed relation between the said driving element and the said driven element; and means connecting the fluid flywheel with the planetary gear means so that different adjustments of said set of blades will cause different speed relations between the driven shaft and the drive member.

2. A transmission of the character described including: a fluid flywheel with a driving element having a set of driving blades, and a driven element having a set of driven blades; a planetary gear means including a set of planetary gears on a planetary gear carrier, a sun gear, and a driven gear; a drive member for the transmission; means to connect the said drive member so as to rotate both the planetary gear carrier and the driven element of the fluid flywheel; means to drive the driving element of the fluid flywheel by the sun gear; a driven shaft for the transmission; means to drive the driven shaft by the said driven gear of the planetary gear means; and means to radially shift the relative position of one of the named set of blades in respect to the position of the other named set of blades so as to affect the driving condition of the transmission.

3. A transmission of the character described including: a fluid flywheel including a driving element with a set of driving blades, a driven element with a set of driven blades, and means for adjusting the position of some of the said blades along their surfaces for adjusting the effective diameter of one of the named set of blades in respect to the effective diameter of the other named set of blades; a planetary gear means including a set of planetary gears on a planetary gear carrier, a sun gear, and a driven gear; a drive member for the transmission; means to connect the said drive member so as to rotate as a unit with the planetary gear carrier and the driven element of the fluid flywheel; means to drive the driving element of the fluid flywheel by the sun gear; a driven shaft for the transmission; and means to drive the driven shaft by the said driven gear of the planetary gear means.

4. A transmission of the character described including: planetary gear means; a drive member to drive the planetary gear means; a driven shaft driven by the planetary gear means; a fluid flywheel including a driving element with a set of driven blades, a driven element with a set of driven blades, and means for adjusting the position of some of the said blades along their surfaces for adjusting the effective diameter of one of the named set of blades in respect to the effective diameter of the other named set of blades for adjusting the speed relation between the said driving element and the said driven element; and means connecting the fluid flywheel with the planetary gear means so that different adjustments of the effective diameter of a set of blades will cause different speed relations between the driven shaft and the drive member.

5. A transmission of the character described including: a fluid flywheel including a driving element with a set of blades radially movable away from, or closer to, the axis of rotation of the fluid flywheel, and a driven element with a set of blades; a planetary gear means including a set of planetary gears on a planetary gear carrier, a sun gear, and a driven gear; a drive member for the transmission; means to connect the said drive member so as to rotate as a unit with the planetary gear carrier and the driven element of the fluid flywheel; means to drive the driving element of the fluid flywheel by the sun gear; a driven shaft for the transmission; and means to drive the driven shaft by the said driven gear of the planetary gear means.

6. A transmission of the character described including: a fluid flywheel including a set of driving blades that rotates the fluid of the fluid flywheel, a set of driven blades, a chamber free of blades for allowing the fluid to expand after having absorbed kinetic energy from the driving blades, means to guide the fluid into the driven blades so that kinetic energy of the fluid will be absorbed by the driven blades, and means for moving one of the said sets of blades into the chamber free of blades for regulating the expansion of the fluid in its travel between the driving blades and the driven blades; a planetary gear means including a set of planetary gears on a planetary gear carrier, a sun gear, and a driven gear; a drive member for the transmission; means to connect the said drive member so as to rotate as a unit with the planetary gear carrier and the set of driven blades; means to drive the driving blades by the sun gear; a driven shaft for the transmission; and means to drive the driven shaft by the said driven gear of the planetary gear means.

7. A transmission of the character described including: a planetary gear means; a drive member to drive the planetary gear means; a driven shaft driven by the planetary gear means; a fluid flywheel including a set of driving blades that rotates the fluid of the fluid flywheel, a set of driven blades, a chamber free of blades for allowing the fluid to expand after having absorbed kinetic energy at a given speed from the driving blades, means to guide the fluid into the driven set of blades so that kinetic energy of the fluid will be absorbed by the driven blades but at a speed different than was first mentioned, and means for moving one of the said sets of blades into the chamber free of blades for regulating the expansion of the fluid in its travel between the driving blades and the driven blades; and means connecting the fluid flywheel with the planetary gear means so that the speed difference mentioned also causes a speed difference between the driven shaft and the drive member.

8. A transmission of the character described including: a hydraulic coupling having a driving element, a driven element, and means for variable speed ratios between the driving element and the driven element, and means for adjusting said ratios; a planetary gear means including a set of planetary gears on a planetary gear carrier, a sun gear, and a driven gear; a drive member for the trnsmission; means to connect the said drive member so as to rotate as a unit with the planetary gear carrier and the driven element; means to drive the driving element by the sun gear; a driven shaft for the transmission; means to drive the driven shaft by the said driven gear of the planetary gear means; a governor device; means to connect the governor device with said means for adjusting said ratios so as to control same by the governor device; and driving means connecting said governor device with the transmission.

9. A transmission of the character described including: a fluid flywheel having a driving element, a driven element, and means for securing variable speed ratios between the driving element and the driven element, and means for adjusting said ratios; a planetary gear means including a set of planetary gears on a planetary gear carrier, a sun gear, and a driven gear; a drive member for the transmission; means to connect the said drive member so as to rotate as a unit with the planetary gear carrier and the driven element; means to drive the driving element by the sun gear; a driven shaft for the transmission; means to drive the driven shaft by the said driven gear of the planetary gear means; a governor device; means to connect the governor device with said means for adjusting said ratios so as to control same by the governor device; and driving means connecting said governor device with the transmission.

10. A transmission of the character described including: a fluid flywheel with a driving element having a set of driving blades, and a driven element having a set of driven blades; a planetary gear means including a set of planetary gears on a planetary gear carrier, a sun gear, and a driven gear; a drive member for the transmission; means to connect the said drive member so as to rotate both the planetary gear carrier and the driven element of the fluid flywheel; means to drive the driving element of the fluid flywheel by the sun gear; a driven shaft for the transmission; means to drive the driven shaft by the said driven gear of the planetary gear means; means to shift the relative position of one of the named set of blades in respect to the position of the other named set of blades; a governor device; means to connect the governor device with the said means to shift the relative position of one of the named set of blades so as to control same by the governor device; and drive means connecting said governor device with the transmission.

11. A transmission of the character described including: a fluid flywheel including a driving element with a set of blades, a driven element with a set of blades, and means for changing the effective diameter of one of the named set of blades in respect to the effective diameter of the other named set of blades; a planetary gear means including a set of planetary gears on a planetary gear carrier, a sun gear, and a driven gear; a drive member for the transmission; means to connect the said drive member so as to rotate as a unit with the planetary gear carrier and the driven element of the fluid flywheel; means to drive the driving element of the fluid flywheel by the sun gear; a driven shaft for the transmission; means to drive the driven shaft by the said driven gear of the planetary gear means; a governor device; means to connect the governor device with the said means for changing the effective diameter of one of the named set of blades in respect to the effective diameter of the other named set of blades so as to control same by the governor device; and drive means connecting said governor device with the transmission.

12. A transmission of the character described including: a fluid flywheel including a driving element with a set of blades radially movable away from, or closer to, the axis of rotation of the fluid flywheel, and a driven element with a set of blades; a planetary gear means including a set of planetary gears on a planetary gear carrier, a sun gear, and a driven gear, a drive member for the transmission; means to connect the said drive member so as to rotate as a unit with the planetary gear carrier and the driven element of the fluid flywheel; means to drive the driving element of the fluid flywheel by the sun gear; a driven shaft for the transmission;

means to drive the driven shaft by the said driven gear of the planetary gear means; a governor device; means to connect the governor device with the set of blades radially movable away from, or closer to, the axis of rotation of the fluid flywheel so as to control same by the governor device; and drive means connecting said governor device with the transmission.

13. A transmission of the character described including: planetary gear members; a drive member to drive the planetary gear means:; a fluid flywheel including a set of blades radially movable away from, or closer to, the axis of rotation of the fluid flywheel; means to adjust the radial position of the blades; means connecting the fluid flywheel with the planetary gear means so that different adjustments of the radial position of the blades will cause different speed relations between the driven shaft and the drive member; a governor device; means to connect the governor device with the said means to adjust the radial position of the blades so as to control same by the governor device; and drive means connecting said governor device with the transmission.

14. A transmission of the character described including: planetary gear means; a drive member to drive the planetary gear means; a driven shaft driven by the planetary gear means; a fluid flywheel including a driving element with a set of blades, a driven element with a set of blades, and adjustment means for changing the effective diameter of one of the named set of blades in respect to the effective diameter of the other named set of blades; means connecting the fluid flywheel with the planetary gear means so that different adjustments of the effective diameter of a set of blades will cause different speed relations between the driven shaft and the drive member; a governor device; means to connect the governor device with the said adjustment means so as to control same by the governor device; and drive means connecting the said governor device with the transmission.

15. A transmission of the character described including: a fluid flywheel with an element having a set of blades, said set of blades being radially adjustable so as to vary the effective diameter of the fluid flywheel; means to adjust the blades to different effective diameters; planetary gear means; a drive member for the transmission; means to drive the planetary gear means by the drive member; means to rotate the said element of the fluid flywheel by the planetary gear means so that the said element will rotate at equal, or greater speed than the said drive member for the transmission; a driven shaft for the transmission; drive means to drive the driven shaft by the planetary gear means; and means to connect the fluid flywheel with the planetary gear means so that varying the effective diameter of the fluid flywheel will react upon the planetary gear means to vary the driving relation between the drive member and the driven shaft.

16. A transmission of the character described including: a fluid flywheel with a set of driving blades having an effective diameter, a set of driven blades having an effective diameter different than the first mentioned effective diameter, a compartment for operating fluid and shaped to guide the fluid from the set of driving blades to the set of driven blades, said compartment being free of blades so as to allow the fluid to change in effective diameter after leaving the said set of driving blades with one effective diameter and before entering the said set of driven blades with the different effective diameter; a planetary gear means including a set of planetary gears on a planetary gear carrier, a sun gear, and a driven gear; a drive member for the transmission; means to connect the said drive member so as to rotate as a unit with the planetary gear carrier and the set of driven blades; means to drive the said set of driving blades by the sun gear; a driven shaft for the transmission; and means to drive the driven shaft by the driven gear of the planetary gear means.

17. A transmission of the character described including: a fluid flywheel with a set of driving blades having an effective diameter, a set of driven blades having an effective diameter different than the first mentioned effective diameter, a compartment for operating fluid and shaped to guide the fluid from the set of driving blades to the set of driven blades, said compartment being free of blades so as to allow the fluid to change in effective diameter after leaving the said set of driving blades with one effective diameter and before entering the said set of driven blades with the different effective diameter; means to change the effective diameter of one of the named sets of blades by moving the blades into or out of the said compartment thereby varying the amount the fluid is allowed to change in effective diameter after leaving the said set of driving blades and before entering the said set of driven blades; a planetary gear means including a set of planetary gears on a planetary gear carrier, a sun gear, and a driven gear; a drive member for the transmission; means to connect the said drive member so as to rotate as a unit with the planetary gear carrier and the set of driven blades; means to drive the said set of driving blades by the sun gear; a driven shaft for the transmission; and means to drive the driven shaft by the driven gear of the planetary gear means.

18. A transmission of the character described including: a fluid flywheel including a driving element with a set of blades, a driven element with a set of blades, and means for radially adjusting the effective diameter of one of the named set of blades in respect to the effective diameter of the other named set of blades; a planetary gear means including a set of planetary gears on a planetary gear carrier, a sun gear, and a driven gear; a drive member for the transmission; means to connect the said drive member so as to rotate as a unit with the planetary gear carrier and the driven element of the fluid flywheel; means to drive the driving element of the fluid flywheel by the sun gear; a driven shaft for the transmission; and means to drive the driven shaft by the said driven gear of the planetary gear means.

19. A transmission of the character described including: a fluid flywheel including a driving element with a set of blades, a driven element with a set of blades, one of said sets of blades having pivots, the axes of which are at right angles to the surfaces of the blades, and means for moving the blades about their pivots for changing the effective diameter of one of the named set of blades in respect to the effective diameter of the other named set of blades; a planetary gear means including a set of planetary gears on a planetary gear carrier, a sun gear, and a driven gear; a drive member for the transmission; means to connect the said drive member so as to rotate as a unit with the planetary gear carrier and the driven element of the fluid flywheel; means to drive the driving element of the fluid flywheel by the sun gear; a driven shaft for the transmission; and means to drive the driven shaft by the said driven gear of the planetary gear means.

20. A transmission of the character described, including: a fluid flywheel with an element having a set of blades, said set of blades having pivots, the axes of which are at right angles to the surfaces of the blades, and movable about the pivots for changing the effective diameter of the fluid flywheel; planetary gear means; a drive member for the transmission; means to drive the planetary gear means by the drive member; means to rotate the said element of the fluid flywheel by the planetary gear means so that the said element will rotate at equal, or greater speed than the said drive member for the transmission; a driven shaft for the transmission; drive means to drive the driven shaft by the planetary gear means; and means to connect the fluid flywheel with the planetary gear means so that changing the effective diameter of the fluid flywheel will react upon the planetary gear means to vary the driving relation between the drive member and the driven shaft.

21. A transmission of the character described including: planetary gear means; a drive member to drive the planetary gear means; a driven shaft driven by the planetary gear means; a fluid flywheel including a driving element, a driven element, and one of said elements having a set of blades movable on pivots, the axes of which are at right angles to the surfaces of the blades, for affecting the speed relation between the said driving element and the said driven element; and means connecting the driving element and the driven element of the fluid flywheel with the planetary gear means so that moving the blades on their pivots will cause different speed relations between the driven shaft and the drive member.

22. A transmission of the character described including: a fluid flywheel with an element having a set of blades, said set of blades being adjustable in line with their surfaces so as to adjust their effective diameter on the fluid flywheel; planetary gear means; a drive member for the transmission; means to drive the planetary gear means by the drive member; means to rotate the said element of the fluid flywheel by the planetary gear means so that the said element will rotate at equal, or greater speed than the said drive member for the transmission; a driven shaft for the transmission; drive means to drive the driven shaft by the planetary gear means; and means to connect the fluid flywheel with the planetary gear means so that adjusting the effective diameter of the said set of blades of the fluid flywheel will react upon the planetary gear means to vary the driving relation between the drive member and the driven shaft.

23. A transmission of the character described including: planetary gear means, a drive member to drive the planetary gear means; a driven shaft driven by the planetary gear means; a fluid flywheel including a first set of blades having a variable effective diameter on the fluid flywheel, a second set of blades located at the large diameter of the fluid flywheel, and means for varying the effective diameter of the said first set of blades from a comparatively small effective diameter to an effective diameter substantially as large as that of the said second set of blades, for affecting the speed relation between the said first set of blades and the said second set of blades; and means connecting the said first set of blades and the said second set of blades of the fluid flywheel with the planetary gear means so that varying the effective diameter of the said first set of blades will cause different speed relations between the driven shaft and the drive member.

CLIFTON R. ROCHE.